United States Patent [19]

Vauk

[11] Patent Number: 4,686,775

[45] Date of Patent: Aug. 18, 1987

[54] ABSORBENT DRYING METHOD BY CONTACTING WITH A HYDROCARBON

[75] Inventor: Dennis A. Vauk, Santa Ana, Calif.

[73] Assignee: Union Oil Company of California, Los Angeles, Calif.

[21] Appl. No.: 790,848

[22] Filed: Oct. 24, 1985

Related U.S. Application Data

[63] Continuation-in-part of Ser. No. 562,475, Dec. 16, 1983, abandoned.

[51] Int. Cl.$^4$ .................. F26B 3/00; B01D 53/02; B01J 20/34; B01J 23/72

[52] U.S. Cl. .................................. 34/9; 55/33; 55/34; 55/73; 55/74; 208/91; 208/138; 208/243; 208/244; 208/246; 208/247; 502/31; 502/346; 502/415

[58] Field of Search .................. 502/29, 31, 346, 415; 34/9; 55/33, 34

[56] References Cited

U.S. PATENT DOCUMENTS

| | | | |
|---|---|---|---|
| 2,271,665 | 2/1942 | Schulze et al. | 208/246 |
| 2,390,556 | 12/1945 | Ruthruff | 34/9 |
| 3,684,698 | 8/1972 | Hallman | 208/140 |
| 4,028,069 | 6/1977 | Nolley, Jr. et al. | 55/33 |
| 4,204,947 | 5/1980 | Jacobson et al. | 208/243 |
| 4,209,911 | 7/1980 | Weber | 34/9 |
| 4,263,020 | 4/1981 | Eberly, Jr. | 55/74 |
| 4,336,130 | 6/1982 | Miller et al. | 208/243 |
| 4,358,297 | 11/1982 | Eberly, Jr. | 55/73 |
| 4,404,118 | 9/1983 | Herskovits | 55/75 |

OTHER PUBLICATIONS

"Catalytic Reforming of Naphtha," Chapter 7, p. 58 of *Catalytic Process and Proven Catalysts* by Charles L. Thomas, Academic Press (1970).
"Hydrocarbon-Water Solubilities at Elevated Temperatures and Pressures" by John Griswold and J. E. Kasch set forth in *Industrial and Engineering Chemistry*, Jul. (1942).
"Tour of Adsorption Fundamentals" by H. M. Barry set forth in *Chemical Engineering*, Feb. 8, 1960.
*Research Disclosure*-No. 182-Jun. 1979, p. 305, "Method of Drying Platformer Feed" (18204) Schel Research Ltd.

*Primary Examiner*—P. E. Konopka
*Attorney, Agent, or Firm*—Dean Sandford; Gregory F. Wirzbicki; Alan H. Thompson

[57] ABSTRACT

A method for drying a catalytic absorbent involves the contacting of a drying fluid with the wet absorbent until the absorbent is reduced to a desired level of water content. Prior to startup of a process employing a catalytic absorbent to remove impurities from a liquid hydrocarbon, water is removed from the absorbent by contact with the liquid hydrocarbon.

40 Claims, No Drawings

ABSORBENT DRYING METHOD BY CONTACTING WITH A HYDROCARBON

RELATED APPLICATIONS

This application is a continuation-in-part application of U.S. Application Ser. No. 562,475, filed Dec. 16, 1983, now abandoned.

BACKGROUND OF THE INVENTION

This invention relates to the pretreatment of catalytic absorbents employed in non-hydrogenative hydrocarbon processing, and particularly, to a method for removing water from a catalytic absorbent prior to the absorbent being employed in a process for desulfurizing a hydrocarbon feedstock.

Hydrocarbon refining processes such as catalytic reforming are utilized for such purposes as dehydrogenation, hydrogenation, cyclization, dehydrocyclization, isomerization and dehydroisomerization of selected hydrocarbons. Catalytic reforming processes play an integral role in upgrading straight run or cracked naphtha feedstocks, as by increasing the octane number of the gasoline fraction contained in such feedstocks. In a typical reforming process treating a straight run naphtha or cracked naphtha, the feedstock is upgraded by contact with a catalyst comprising a noble metal on alumina, and more particularly, noble metal catalysts containing hydrogenation promoters such as rhenium and cracking promoters in the alumina such as chlorine. Conditions utilized in reforming processes vary depending upon such factors as the type of feed processed and the desired increase in octane level.

To achieve maximum run lengths and increase process efficiency, it is generally recognized that the sulfur content of the feedstock must be minimized. Reforming catalysts, and particularly those comprising platinum, and most particularly comprising platinum, rhenium and chlorine, are poisoned and, in effect, deactivate rapidly, in the presence of sulfur compounds. As a result, it is necessary to reduce the sulfur content of reformer feedstocks as low as possible, and preferably, feedstocks contacted with reforming catalysts are desulfurized to contain less than 0.1 ppm by weight sulfur.

A common method of treating reformer feeds to reduce the sulfur content is by hydrodesulfurization wherein a naphtha or other hydrocarbon is contacted with a sulfur-tolerant hydrogenation catalyst in the presence of hydrogen. The sulfur in the hydrocarbon is converted to hydrogen sulfide, which may be separated from the naphtha by conventional means prior to reforming. Although highly effective sulfur removal may be achieved by hydrodesulfurization units operating under severe conditions, the efficiency of such processes is ultimately limited by equilibrium and/or kinetic considerations. In many instances, it is not possible to obtain hydrodesulfurized products containing less than 0.1 ppmw sulfur as desired in most reforming operations. Furthermore, it is impossible to guard against upsets in the hydrodesulfurization unit which can result in high levels of organosulfur compounds remaining in the reformer feedstock.

In addition to hydrodesulfurization, there are other methods employing catalytically active materials for removing sulfur from hydrocarbons. One such method reduces the sulfur content of the hydrocarbon by "absorbing" sulfur onto a catalytically active absorbent material under non-hydrogenative conditions, i.e., conditions involving contact of the absorbent material with a hydrocarbon essentially in the absence of free hydrogen. Usually, the absorbent material contains a metal component, such as nickel, copper or silver, supported on a porous refractory oxide, and the feedstocks generally treated are reformer feedstocks, particularly naphthas. Typical of such processes include the process disclosed in U.S. Pat. No. 2,767,759 to Annable wherein a bed of nickel molybdate pellets is utilized to reduce the sulfur content of naphthas. Similarly, in U.S. Pat. No. 4,204,947 to Jacobson et al., the use of copper components supported on conventional carriers is disclosed for reducing the thiol content of naphthas by absorption. In addition, Thorn in U.S. Pat. No. 2,876,196 describes a method for desulfurizing hydrocarbon feedstocks by contact with catalytic particles comprising platinum supported on a suitable carrier. The metallic components of such catalytic absorbents are effective for their intended use in either an oxidized or reduced form, depending upon the particular catalytic absorbent.

In some cases, the catalytic absorbent accumulates physically absorbed water on its surface prior to being employed for its intended use. Accordingly, there is a need to provide a method for drying a catalytic absorbent prior to placing it onstream for hydrocarbon processing.

Furthermore, there is a need to provide a method for drying a catalytic absorbent, while still maintaining the effective form of the metals supported on the absorbent.

Another object of the invention is to provide a method for removing accumulated water from a catalytic absorbent, and more particularly, to remove water from a catalytic absorbent prior to the absorbent's use in a hydrocarbon processing scheme.

It is another object of the invention to provide a method to protect a reforming catalyst that is susceptible to damage and/or deactivation due to contact with too much water.

More particularly, it is an object of the invention to provide a convenient method for drying a catalytic absorbent employed in a non-hydrogenative desulfurization process of a naphtha-containing hydrocarbon feedstock located upstream of a catalytic reformer processing unit that requires the presence of hydrogen.

These and other objects and advantages of this invention will become apparent to those skilled in the relevant art in view of the following description of the invention.

SUMMARY OF THE INVENTION

Briefly, the invention involves a method for drying a catalytic absorbent containing a calcined, amorphous, porous inorganic oxide wherein water is removed from the absorbent by contact with a drying fluid. In one embodiment, a catalytic absorbent containing accumulated water is contacted with a liquid hydrocarbon such that water is removed from the absorbent and an effluent liquid hydrocarbon containing the removed water is produced.

In a preferred embodiment, a catalytic absorbent, comprising copper or nickel components on calcined alumina and having water accumulated on its surface, is contacted under water-removing conditions with a naphtha-containing liquid hydrocarbon. The naphtha-containing liquid hydrocarbon first contacts the catalytic absorbent under drying conditions for a time sufficient to remove a significant amount of water from the absorbent, and the water-containing effluent is diverted from a downstream hydrocarbon reformer unit or other catalytic processing unit. Once the water content of the effluent is reduced to a desired level, it is then contacted with the downstream reforming or other refining catalysts.

It will be understood that the term "catalytic absorbent" is used herein to describe a material with which a hydrocarbon is contacted for the purpose of removing impurities therefrom by whatever mechanism, including adsorption, absorption, deposition, chemical reactions, etc., or some combinations of such mechanisms, wherein such impurities are retained on the catalytic absorbent. Also, the term "sulfur," as used herein, is intended to include sulfur in whatever form, elemental or combined, it may be present. Also, all feedstock and product oil sulfur concentrations are herein calculated as elemental sulfur.

DETAILED DESCRIPTION OF THE INVENTION

The invention relates to a method for drying a catalytic absorbent useful for removing impurities such as sulfur from hydrocarbons by contacting the absorbent with a drying fluid and producing an effluent fluid containing an increased concentration of water as compared to the fluid prior to contact with the absorbent. Preferably, water removed from the catalytic absorbent is that water physically accumulated on the surface after preparation of the absorbent (especially after the preparational calcination step), but prior to the absorbent's first use in service to treat hydrocarbons.

Catalytic absorbents employed in the invention exhibit hygroscopic properties, especially when such absorbents contain a hydrophilic, amorphous, porous refractory oxide. Frequently, a significant amount of water from the atmosphere, or otherwise, is accumulated on the catalytic absorbent prior to employment in hydrocarbon processing. Up to 20 weight percent or more of water may accumulate on the absorbent when the absorbent is exposed to the atmosphere, such as during loading into a reactor vessel or during storage prior to use. During the startup operation for the process utilizing the absorbent, water which has accumulated on the absorbent may be removed so rapidly and/or in such large amounts that, when carried downstream, it is capable of damaging catalysts, such as those in a catalytic reforming unit. During such startup operations, water is removed from the absorbent in a relatively large amount over a short period of time, forming a hydrocarbon-water slug in the effluent which contains an unacceptable concentration of water. For example, in a desulfurization-reforming operation, water removed from the desulfurization catalytic absorbent would, if contacted with such a slug, quickly deactivate the reforming catalyst due to removal of the chloride promoter by a "washing" effect.

Due to their hygroscopic properties, many catalytic absorbents accumulate water in amounts above about 0.05 weight percent, preferably above about 0.1 weight percent, and typically about 0.1 to 20 weight percent, and most usually from about 0.2 to about 10 weight percent by weight of the dry absorbent. Such accumulated water is physically absorbed on the absorbent. The water ordinarily accumulates on the absorbent during shipment or storage or during loading of the absorbent in a reactor vessel prior to use. Typically, water vapor from the atmosphere is the major source of water accumulated on the water-containing absorbent.

Catalytic absorbents which may be treated by the method of the invention include those water-containing materials capable of absorbing impurities from a hydrocarbon or mixture thereof. Ordinarily, the catalytic absorbent contains one or more metal components supported on an amorphous, porous refractory oxide having sufficient surface area for absorption of impurities and having essentially all pores of diameter greater than 20 angstroms. Furthermore, the support material contained in the absorbent is a calcined, large pore refractory oxide that has essentially no molecular sieving properties. However, the amorphous, porous refractory oxide support contained in the absorbent is calcined at a temperature greater than 500° F. and typically greater than 800° F., prior to being dried by the method of the invention. Typical catalytic absorbents treated in the present invention are disclosed in U.S. Pat. Nos. 4,204,947 and 4,336,130, which are herein incorporated by reference in their entirety. Preferred amorphous, porous refractory oxide supports include alumina, silica, silica-alumina, zirconia, titania, boria, magnesia and combinations thereof. The most preferred support is gamma alumina having a surface area above about 100 $m^2$/gram. Typical metal components are zinc, nickel, platinum, cobalt, iron and molybdenum; however, the preferred metal components are copper components, especially copper oxides, and reduced forms of nickel. It is highly preferred that the catalytic absorbent be capable of removing sulfur upon contact with a sulfur-containing fluid, such as a liquid hydrocarbon.

A preferred catalytic absorbent of the invention is prepared by first comulling a copper component, such as copper(II) carbonate, or a nickel component, such as nickel carbonate, with alumina to form an extrudable paste, and then extruding the paste through a die and calcining the extrudate at a temperature greater then 700° F. to produce a copper-gamma alumina or nickel-gamma alumina extrudate having a circular cross-sectional diameter from about ¼ to about 1/20 inches, preferably about ⅛ inch, containing about 10 to about 20 weight percent of copper oxide, calculated as Cu, or about 10 to about 80 weight percent of nickel, calculated as Ni, and having essentially all pores of diameter greater than about 20 angstroms. The surface area of the absorbent is about 250 to about 350 $m^2$/gram, the compact bulk density is about 0.5 to about 0.9 grams/ml, and the crushing strength is about 15 to about 30 lbs/⅛ inch length. (Crushing strength in "lbs/⅛ inch length" is determined for an extrudate or other absorbent sample of cylindrical shape having a ⅛ inch length and a ⅛ inch diameter, using metal jaws having a width of ⅛ inch and with the force applied on the circumferential surface of the cylinder.)

In the method of the invention, a water-containing catalytic absorbent is contacted, under drying conditions, with a drying fluid to remove water from the absorbent. The drying fluid may be any substance in gas or liquid form which is capable of removing water from the absorbent and carrying said water to a different location. In the case of absorbents containing metal components that are more effective for their intended purpose in the non-reduced form, contact of the drying fluid with the absorbent preferably does not result in reduction of the metallic components of the absorbent. Examples of drying gases include non-reducing gases such as carbon dioxide, air or oxygen, with inert gases, such as nitrogen, being preferred. Typically, the drying fluid is substantially anhydrous, i.e., containing less than about 100 ppmw water.

The most highly preferred drying fluid in the present invention is a liquid hydrocarbon. Liquid hydrocarbons commonly employed in the method described herein include broadly those that are, at least in part, miscible with water and usually contain impurities capable of being removed by a catalytic absorbent. Among the suitable liquid hydrocarbons are straight run and refined petroleum naphthas, hydrotreated or hydrocracked streams and fractions thereof, especially those containing organosulfur compounds, particularly mercaptans. It is highly preferred that the liquid hydrocarbon be the same feedstock that subsequently is contacted by the catalytic absorbent to remove impurities from the hydrocarbon.

The conditions for drying the water-containing absorbent typically include an elevated temperature, usually above about 225° F., preferably above about 250° F., and most preferably above about 300° F. A typical temperature range over which effective absorbent drying occurs is about 225° F. to about 400° F., and preferably about 250° F. to about 325° F. A drying temperature that is less than about a 100° F. deviation from the inlet, steady state temperature of the reaction vessel in which the absorbent will subsequently be used is highly preferred. Furthermore, the drying fluid, and preferably a liquid hydrocarbon, contacts the water-containing absorbent at a temperature that increases from ambient at a rate that avoids significant or substantial damage to the absorbent. Such damage includes a substantial loss of surface area, loss of metal components and/or loss of absorbent activity. In order to avoid absorbent damage during the temperature increase, the rate of temperature increase is such that water is removed from the absorbent at a rate generally less than about 1 lb/hr/lb of absorbent, but typically less than about 0.10 lb/hr/lb of absorbent, and preferably less than about 0.01 lb/hr/lb of absorbent. Ordinarily, the temperature is raised at a rate less than about 300° F./hr, preferably less than about 100° F./hr, and most preferably less than about 50° F./hr, as measured at the effluent outlet of the absorbent reactor vessel. The water removed from the absorbent and transported in the preferred effluent liquid hydrocarbon is ordinarily maintained at less than about 700 ppmw, and preferably less than about 500 ppmw until the catalytic absorbent is dried to a desired water content.

Furthermore, a suitable temperature increase during the contacting of the absorbent and a drying fluid results in a substantial amount of water being removed from the water-containing catalytic absorbent. A substantial amount of water removed from the absorbent is an amount such that additional water lost from the absorbent during the absorbent's subsequent intended use (removing impurities from a hydrocarbon) is not detrimental to downstream processing catalysts and to the absorbent.

In one embodiment of the invention, a catalytic absorbent utilized in at least one stage of a hydrocarbon processing scheme to remove impurities is dried prior to use in the scheme. The catalytic absorbent, containing removable water, is contacted with a drying fluid, under drying conditions that include a temperature greater than about 225° F. and an elevated pressure. Other conditions include, in the case of a liquid drying fluid, a pressure greater than about 100 p.s.i.g. and a liquid hourly space velocity greater than about 0.1, and usually from about 0.2 to about 20 LHSV. A gaseous drying fluid usually contacts the absorbent at drying conditions including a pressure greater than atmospheric and a gaseous hourly space velocity greater than about 50, and usually from about 100 to 10,000 GHSV.

In the preferred method of the invention, the water is transferred from the absorbent to the drying fluid, and the water-containing drying fluid is prevented from contact with downstream processing stages (if any) until the water content of the effluent fluid falls to or below a desired or predetermined level. Once the water content of the effluent fluid falls below the desired level, the absorbent may then be immediately employed for its intended use, i.e., removing impurities from a hydrocarbon under hydrocarbon processing conditions. Typically, the water content of the effluent fluid, once falling below the desired level, is maintained at or below said level for at least about 5 hours, and preferably at least about 20 hours, before contact of the effluent with downstream catalysts is permitted. The predetermined level will vary depending on the particular process but will typically be less than about 100 ppmw, preferably less than about 50 ppmw, and more preferably less than about 15 ppmw water. In a reforming process, the predetermined effluent water content is most preferably less than about 10 ppmw.

In an integrated process involving non-hydrogenative desulfurization followed by a hydrogenative reforming process, a highly preferred embodiment of the invention involves "in situ" treatment of the desulfurizing catalytic absorbent, i.e., employing as the drying fluid, the feedstock that is subsequently to be treated by the catalytic absorbent. Such feedstocks usually contain above about 0.1 ppmw sulfur and boil in the range from about 150° F. to about 450° F. The preferred absorbent-reformer feedstock is a hydrotreated naphtha containing organosulfur compounds essentially in the form of mercaptans, and the most preferred feedstock is a naphtha-containing liquid hydrocarbon containing between 0.1 and 20 ppmw sulfur in mercaptan form.

In this "in situ" method, the selected liquid hydrocarbon feedstock is first employed to dry the absorbent and then subjected to catalytic absorption of sulfur impurities followed by catalytic reforming, in the presence of hydrogen, over a reforming catalyst. (Preferably, the catalytic absorbent has had no previous use in service to treat hydrocarbons and the reforming catalyst contains platinum or platinum-rhenium on an acidified porous refractory support or other metal-containing reforming catalyst that deactivates upon contact with sulfur or loses cracking activity upon contact with relatively large concentrations of water.) The feedstock is typically contacted with the water-containing desulfurizing absorbent in a vessel under conditions including a pressure sufficient to maintain the hydrocarbon in the liquid phase and a liquid hourly space velocity similar to that employed subsequently in the integral desulfurization/reforming process, usually about 0.1 to about 20 LHSV. The drying conditions of the absorbent-feedstock contacting vessel also include a gradually increasing temperature from ambient to less than about 1,000° F., preferably about 225° F. to about 400° F., and most preferably in a range less than about a 100° F. deviation from the inlet, steady state temperature of the vessel employed in the subsequent desulfurization process. The absorbent is contacted by the feedstock for a time sufficient to dry the absorbent as determined by a gradually diminished concentration of water in the feedstock effluent. The water-containing feedstock effluent is diverted from contacting the downstream reforming catalyst so that any acidifying ions (such as halide ions) in the catalyst's refractory oxide support are not washed out of the catalyst. Such a diversion of the water prevents, in part, a lowering of reforming catalytic activity. Typical downstream reforming catalysts for use herein, such as halogen-promoted catalysts, are capable of losing catalytic activity upon contact with a reforming feedstock that contains greater than about 50 ppmw water, and generally greater than about 100 ppmw.

Any convenient diversion system may be utilized to transport the water-containing effluent feedstock to a location other than that resulting in contact with the reforming catalyst. For example, a refinery blowdown system for the catalytic absorbent contacting vessel may be used. Another alternative is a valved line from the absorbent vessel transporting the water-containing effluent to a stripper or hydrotreating reaction zone.

After the absorbent is sufficiently dried, the conditions of the absorbent-feedstock contacting vessel are adjusted, if necessary, to sulfur-removing conditions, and the feedstock is then contacted with the catalytic absorbent, following which the effluent liquid hydrocarbon is contacted with the reforming catalyst under refining conditions, including the presence of free hydrogen. Such an effluent liquid hydrocarbon usually contains less than about 100, preferably less than about 50, and most preferably less than about 10 ppmw water and less than 0.1 ppmw sulfur.

The invention is further illustrated by the following example which is illustrative of a specific mode of practicing the invention and is not intended as limiting the scope of the invention as defined in the appended claims.

EXAMPLE

An integral process for desulfurizing and catalytically reforming liquid hydrocarbons includes a first reactor vessel, wherein a liquid hydrocarbon is contacted in the absence of free hydrogen, i.e. under non-hydrogenative conditions, with a catalytic absorbent to remove trace sulfur, and a second reactor vessel in which the effluent from the first vessel is contacted in the presence of free hydrogen, with a reforming catalyst. The catalytic absorbent has a ⅛ inch circular cross-sectional shape, a surface area about 283 m²/gram, a compact bulk density of 0.69 grams/ml, a crush strength of 23 pounds/⅛ inch length and a nominal composition containing about 15.0 weight percent of copper oxide, calculated as Cu, and a balance of gamma alumina. The reforming catalyst is a conventional platinum-rhenium composition supported on a chloride-containing alumina. The liquid hydrocarbon contacted with the absorbent in the first zone is a naphtha-containing feedstock that boils in the range from about 180° F. to about 400° F. and contains about 0.4 ppmw sulfur and less than about 10 ppmw water.

Prior to the startup of the process, about 0.34 weight percent of water is accumulated on the catalytic absorbent from the atmosphere or other sources during loading and/or storage after preparation.

In the method of the invention, the first reactor vessel containing the loaded catalytic absorbent is gradually heated to 312° F. during the first five hours of feedstock throughput and maintained at that temperature for a total of 144 hours. During this time period, the effluent from the first reactor vessel is passed to tankage that collects products not meeting process specifications. The effluent is passed to tankage by means of a conventional refinery blowdown system and does not contact the reforming catalyst in the second zone.

The accumulated water on the catalytic absorbent is removed by contact with the naphtha-containing feedstock at drying conditions. The data are summarized in TABLE I.

TABLE I

WATER REMOVAL FROM CATALYTIC ABSORBENT

| Time, hrs. | Temp, °F. | LHSV | Water in effluent, ppmw | Cloudness* in effluent |
|---|---|---|---|---|
| 0.25 | 108 | 0.6 | 43 | slightly cloudy |
| 0.75 | 185 | 0.6 | 101 | cloudy |
| 1.25 | 252 | 0.6 | 340 | very cloudy |
| 2.5 | 274 | 0.6 | 200 | very cloudy |
| 3.75 | 295 | 0.6 | 160 | cloudy |
| 5.0 | 312 | 0.6 | 110 | cloudy |
| 10.0 | 312 | 0.6 | 85 | slightly cloudy |
| 20.0 | 312 | 0.6 | 110 | cloudy |
| 23–44 | 312 | 1.0 | 100 | (slightly cloudy to clear) |
| 44–144 | 312 | 0.6 | 100 | clear |

*Qualitative observation of water content.

During the first 5 hours, the effluent from the first reactor vessel contains as much as about 340 ppmw of water, and after 23 hours, the water content of the effluent drops to less than 100 ppmw.

After 144 hours, the effluent from the first reactor vessel is contacted with the reforming catalyst in the second reactor at a space velocity of about 10 LHSV. At this time, the effluent from the first reactor vessel contains less than about 10 ppmw water. One hour having passed at the increased space velocity and the temperature having reached a level at which absorption is significant, the effluent from the first reactor contains essentially no sulfur (i.e. less than 0.1 ppmw sulfur), and the reforming catalyst in the second reactor performs in the presence of free hydrogen at commercially effective conditions to produce commercially effective results.

Although particular embodiments of the invention have been described, it will be understood, of course, that the invention is not limited thereto since many obvious modifications can be made, and it is intended to include within this invention any such modifications as will fall within the scope of the invention as defined by the appended claims.

I claim:

1. A method for drying a catalytic absorbent, said method comprising contacting a catalytic absorbent comprising copper oxide supported on a calcined, amorphous, porous refractory oxide and containing accumlated water with a liquid hydrocarbon under conditions including a temperature from about 225° to about 400° F. and wherein the copper in said copper oxide is not reduced, and said contacting producing (1) a product catalytic absorbent containing less water than said catalytic absorbent prior to said contacting, and (2) an effluent liquid hydrocarbon containing a greater concentration of water than contained in liquid hydrocarbon prior to said contacting.

2. The method as defined in claim 1 wherein said contacting occurs at a temperature greater than about 225° F.

3. The method as defined in claim 1 wherein said product catalytic absorbent contains less than about 0.05 weight percent accumulated water.

4. The method as defined in claim 1 wherein said liquid hydrocarbon contains sulfur and said product catalytic absorbent following said drying is capable of removing sulfur upon contact with said liquid hydrocarbon.

5. The method as defined in claim 1 wherein said effluent liquid hydrocarbon contains water in a concentration greater than about 100 ppmw.

6. The method as defined in claim 1 wherein said liquid hydrocarbon comprises naphtha.

7. The method as defined in claim 1 wherein said catalytic absorbent contains greater than about 0.05 weight percent accumulated water.

8. The method as defined in claim 1 further comprising drying conditions during said contacting that include a temperature that increases at a rate such that said accumulated water is removed from said catalytic absorbent at a rate less than about 1 lb/hr/lb of said catalytic absorbent.

9. The method as defined in claim 1 wherein said concentration of water in said effluent liquid hydrocarbon is less than about 700 ppmw.

10. The method as defined in claim 1 wherein said catalytic absorbent contains about 0.2 to about 10 weight percent accumulated water prior to said contacting.

11. The method as defined in claim 1 wherein said calcined, amorphous, porous refractory oxide is selected from the group consisting of alumina, silica, silica-alumina, zirconia, titania, boria, magnesia and combinations thereof.

12. The method as defined in claim 11 wherein said refractory oxide is gamma alumina.

13. The method as defined in claim 1 wherein said concentration of water in said liquid hydrocarbon is less than about 100 ppmw prior to said contacting.

14. The method as defined in claim 1 wherein said catalytic absorbent has had no previous use in service to treat hydrocarbons.

15. The method as defined in claim 1 wherein said calcined, amorphous, porous refractory oxide has essentially all pores of diameter greater than about 20 angstroms.

16. The method as defined in claim 1 wherein said contacting occurring under conditions including a temperature that increases at a rate less than about 300° F./hr.

17. A method for drying a catalytic absorbent, said method comprising contacting a catalytic absorbent comprising copper oxide on a support comprising calcined gamma alumina and containing accumulated water with a liquid hydrocarbon comprising naphtha under conditions including a temperature from about 225° F. to about 400° F. and wherein said copper in said copper oxide is not reduced, and said contacting producing (1) a product catalytic absorbent containing less water than said catalytic absorbent prior to said contacting, and (2) an effluent liquid hydrocarbon containing a greater concentration of water than said liquid hydrocarbon prior to contacting.

18. The method as defined in claim 17 wherein said contacting occurs at a temperature greater than about 225° F.

19. The method as defined in claim 17 wherein said product catalytic absorbent contains less than about 0.05 weight percent accumulated water.

20. The method as defined in claim 17 wherein said effluent liquid hydrocarbon has a concentration of water greater than about 100 ppmw.

21. The method as defined in claim 17 wherein said effluent liquid hydrocarbon has a concentration of water less than about 500 ppmw.

22. The method as defined in claim 17 wherein said contacting occurring under conditions including a temperature that increases at a rate less than about 300° F./hr.

23. The method as defined in claim 17 wherein said catalytic absorbent initially contains greater than about 0.05 weight percent accumulated water.

24. The method as defined in claim 22 wherein said rate is less than about 100° F./hr.

25. The method as defined in claim 17 further comprising drying conditions during said contacting that include a temperature that increases at a rate such that said accumulated water is removed from said catalytic absorbent at a rate less than about 0.01 lb/hr/lb of said catalytic absorbent.

26. A method for drying a catalytic absorbent, said method comprising contacting a catalytic absorbent comprising copper oxide on a support consisting essentially of a calcined, amorphous, porous refractory oxide and containing accumulated water with a liquid hydrocarbon under conditions including a temperature from about 225° F. to about 400° F. and wherein the copper in said copper oxide is not reduced, and said contacting producing (1) a product catalytic absorbent containing less water than said catalytic absorbent prior to said contacting, and (2) an effluent liquid hydrocarbon containing a greater concentration of water than contained in said liquid hydrocarbon prior to said contacting.

27. The method as defined in claim 26 wherein said calcined, amorphous, porous refractory oxide is selected from the group consisting of alumina, silica, silica-alumina, zirconia, titania, boria, magnesia and combinations thereof.

28. The method as defined in claim 27 wherein said refractory oxide is gamma alumina.

29. The method as defined in claim 26 wherein said contacting occurring under conditions including a temperature that increases at a rate less than about 300° F./hr.

30. The method as defined in claim 26 wherein said catalytic absorbent contains about 0.2 to about 10 weight percent of said accumulated water prior to said contacting.

31. The method as defined in claim 26 wherein said liquid hydrocarbon comprises from about 0.1 to about 2 ppmw sulfur and less than about 100 ppmw water prior to said contacting.

32. The method as defined in claim 26 wherein said concentration of water in said liquid hydrocarbon is less than about 100 ppmw prior to said contacting.

33. The method as defined in claim 26 wherein said contacting occurs at a temperature greater than about 225° F.

34. The method as defined in claim 26 wherein said product catalytic absorbent contains less than about 0.05 weight percent accumulated water.

35. The method as defined in claim 26 wherein said effluent liquid hydrocarbon has a concentration of water greater than about 100 ppmw.

36. The method as defined in claim 26 wherein said effluent liquid hydrocarbon has a concentration of water less than about 500 ppmw.

37. The method as defined in claim 26 wherein said catalytic absorbent contains greater than about 0.05 weight percent accumulated water.

38. The method as defined in claim 26 further comprising drying conditions during said contacting that include a temperature that increases at a rate such that said accumulated water is removed from said catalytic absorbent at a rate less than about 0.1 lb/hr/lb of said catalytic absorbent.

39. The method as defined in claim 26 wherein said liquid hydrocarbon comprises naptha.

40. The method as defined in claim 26 wherein said calcined, amorphous, porous refractory oxide has essentially all pores of diameter greater than about 20 angstroms.

* * * * *